INVENTOR
GEORGE L. USSELMAN
BY H. S. Grover
ATTORNEY

Oct. 30, 1945.    G. L. USSELMAN    2,388,098
WAVE LENGTH MODULATION
Filed Sept. 29, 1942    3 Sheets-Sheet 2
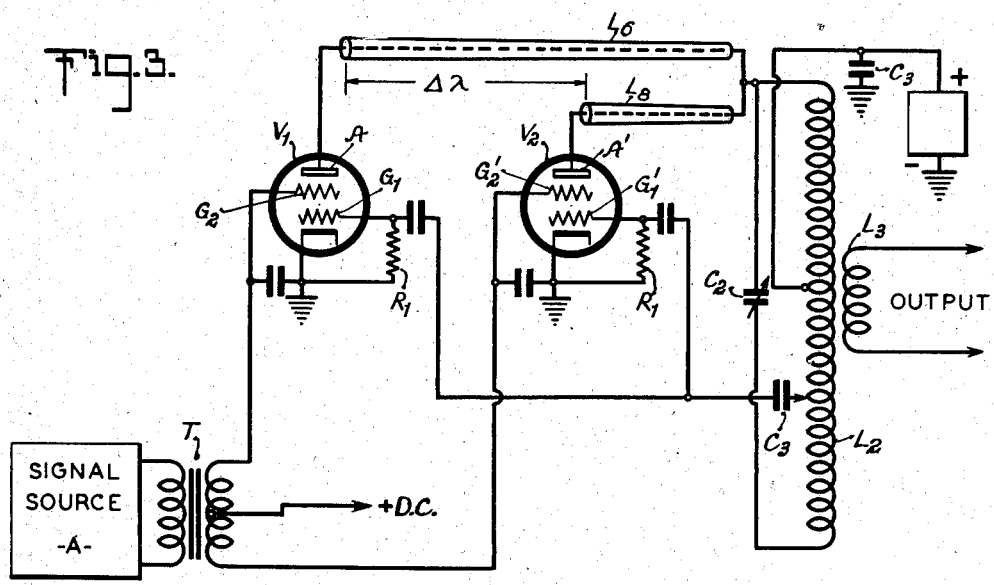
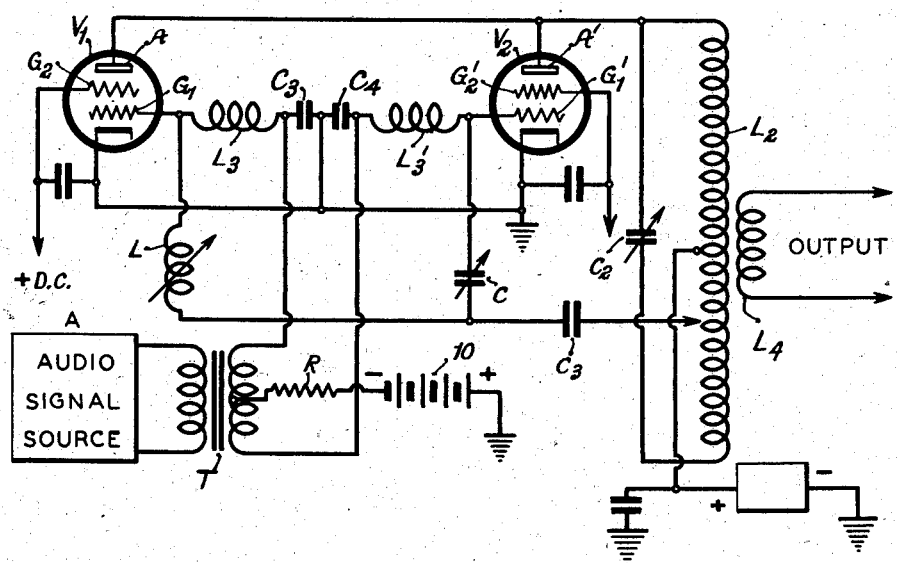
INVENTOR
GEORGE L. USSELMAN
BY H.G.Grover
ATTORNEY

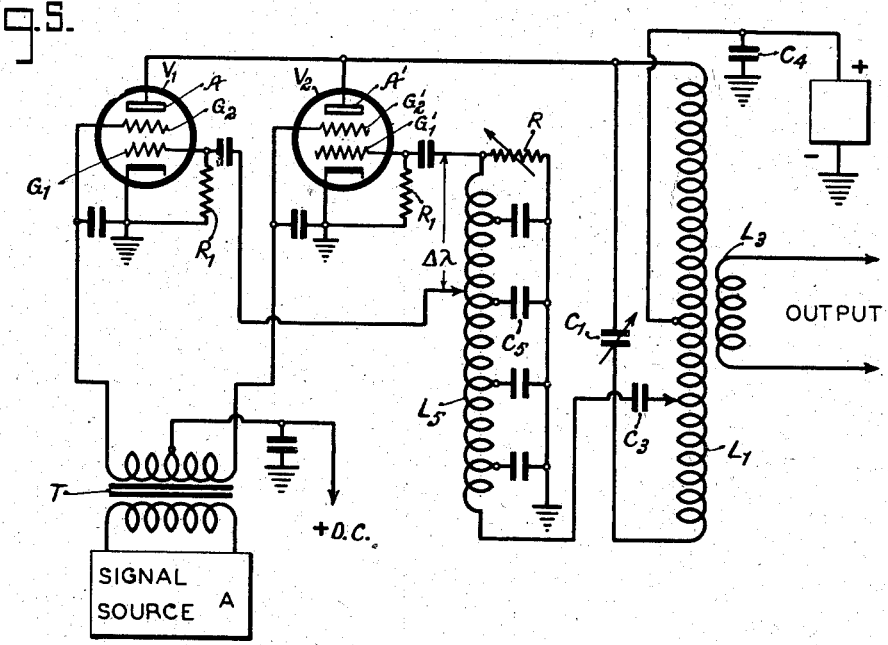
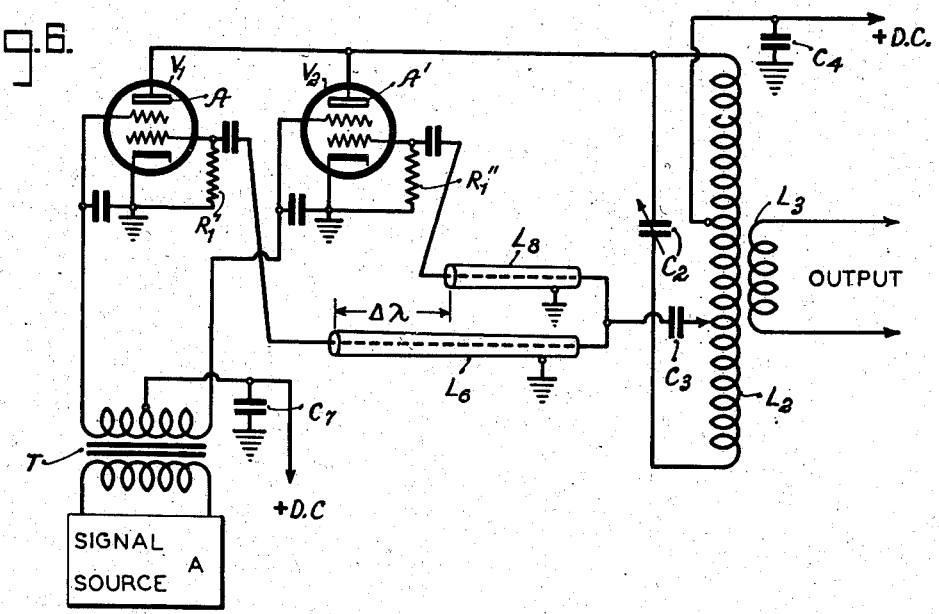

Patented Oct. 30, 1945

2,388,098

UNITED STATES PATENT OFFICE 2,388,098

WAVE LENGTH MODULATION

George L. Usselman, Port Jefferson, N. Y., assignor to Radio Corporation of America, a corporation of Delaware Application September 29, 1942, Serial No. 460,043

12 Claims. (Cl. 179—171.5)

In this application I disclose a new and improved wave length modulation system. The general object of my invention is the improvement of wave length modulation systems. In my simplified system by the use of two tubes only, I generate timing or wave length modulated oscillations of carrier wave frequency in accordance with signals.

In describing my invention in detail reference will be made to the attached drawings, wherein Figures 1 to 6 inclusive each illustrates a different modification of my timing modulated wave generating system.

Figure 1:
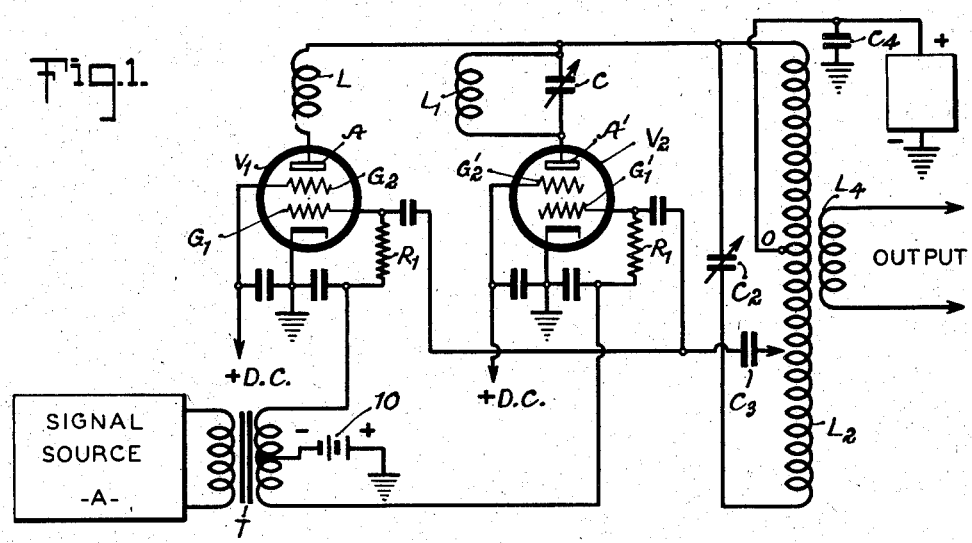

In Figure 1, C2—L2 is a tuned tank circuit resonant substantially at the frequency of the wave generated in the absence of timing or wave length modulation thereof. A point on this tank circuit is coupled by coupling condenser C3 to the control grid electrodes G1 and G1' of a pair of electron discharge devices V1 and V2 the cathodes of which are connected to ground. Coupling condensers, the function of which is known and need not be described, are included between C3 and the grids. The anodes A and A' of these tubes are coupled respectively by inductance L and capacity C to a second point on the tank circuit C2—L2. The inductance L is a phase retarding inductance, while the condenser C is a phase advance condenser. A point on the inductance L2 is connected to the positive terminal of a source of direct current, the negative terminal of which is grounded as is the cathodes of tubes V1 and V2 to complete the direct current circuit. The choke L1 provides a direct current path in shunt to the condenser C. The direct current source is shunted by a radio frequency bypass and coupling condenser C4, which completes the alternating current circuit for the tubes. Note that the grids and anodes of tubes V1 and V2 are connected to points on the tank circuit at opposite sides of the point 0 thereon grounded by condenser C4 so that at the points to which the grids and anodes are coupled voltages of opposed or substantially opposed phase appear.

The control grids G1 and G1' are connected by resistors R1 and R2 to the opposite terminals of the secondary winding of a transformer T, the primary winding of which is connected to a source A representing signals of any nature. Bias for the control grids G1 and G1' is supplied by a source 10 connected between a point on the secondary winding of transformer T and ground. The screen grid electrodes G2 and G2' are supplied from any source of direct current by leads connected as shown, and the said direct current source is shunted by bypassing condensers as is the source 10.

During operation the tank circuit LC—C2 is tuned to the desired carrier; that is, the carrier applicant wishes to send out in the absence of modulation. The control grids G1 and G1' of tubes V1 and V2 receive excitation energy from a point on the tank circuit at one side of the point 0 grounded for radio-frequency potentials. This energy is amplified by tubes V1 and V2 and delivered to the tank circuit through phase shifting elements L and C.

Note that this energy is delivered back into the tank circuit at a point on the other side of the point 0. The energy reaching the tank circuit from tube V1 is retarded in phase by inductance L, while that fed to the tank circuit from V2 is advanced in phase by the condenser C. When no modulation is present, the amplified energies delivered to the tank circuit by tubes V1 and V2 are substantially equal, although they have a fixed phase difference and their resultant takes up an intermediate phase position which is also substantially fixed. Since the phases of the voltages on the grids and anodes of the tubes are substantially opposed (disregarding the phase advance caused by C and retard caused by L) we have the conditions required for the generation of oscillations in each tube.

When signal modulation is applied from A through transformer T, the energy delivered by tubes V1 and V2 respectively is alternately increased and decreased in amplitude. Since these energies have a phase difference determined by L and C and since they are differentially modulated, the resultant of the energies delivered to the tank circuit will be modulated in phase in accordance with signals. Now since the tubes V1 and V2 are oscillators, these phase changes are added to each oscillation cycle. Since the energies fed back to the tank are shifted in accordance with signals, the excitation voltage fed from the other end of the tank to the grids G1 and G1' take on corresponding but opposite phase changes and produce further phase angle change. This produces a further phase change in the resultant of the energies fed back to the tank C2—L2 to cause on the grids G1 and G1' an additional phase angle change thereby producing frequency modulation of the oscillations. The tank circuit C2—L2 stiffness limits the frequency swing having a rapid change in phase angle with changes in frequency which resist change in phase angle beyond an ascertainable limit and thereby prevent the frequency or wave length modulation from building up to exceed an ascertainable limit. The initial phase displacement is, of course, adjustable by the dimensions of L and C.

The timing or wave length modulated oscillations may be fed from the tank circuit L2—C2 to any utilization circuits by usual coupling means, such as, an inductance L4 coupled to L2.

Figure 2:
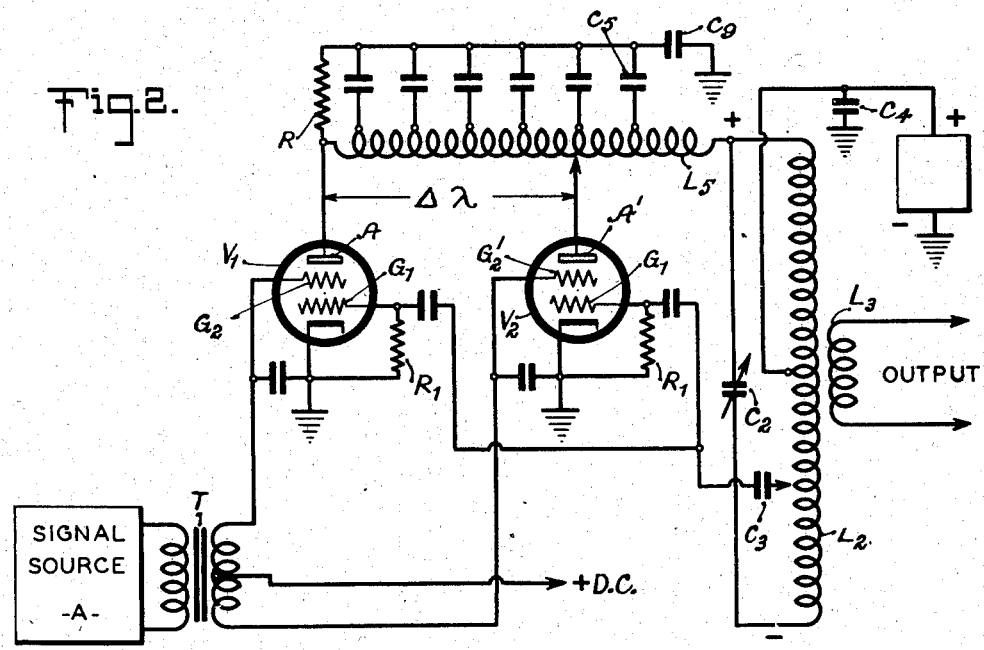

The modification of Figure 2 is in principle the same as the modification in Figure 1, and in Figures 1 and 2 similar parts have been designated by similar reference characters in so far as possible. The modification in Figure 2 differs from that in Figure 1 in the following main respects:

An artificial line C5—L5 is used to produce the phase displacement between the amplified energies fed by the respective tubes V1 and V2 to the tank circuit L2—C2. This line is terminated by a matching resistance R to prevent reflection of wave energy along the line. One of the tubes V2 in the modification shown has its anode A' tapped on the line at a point a fraction of a wave length (or a multiple of a fraction) nearer to the tank circuit L2—C2 than the point to which the anode A of tube V1 is tapped. This causes the amplified energy delivered to the tank circuit from tube V1 to lag in phase behind the energy delivered to the tank circuit by the tube V2. The spacing between the points of connection of the anodes A and A' to the inductance L5 of the line can be substantially anything except multiples of $\tau/2$. However, multiples of $\tau/4$ are believed to operate best under most circumstances.

In Figure 2 the modulation is applied differentially to the screen grids G2 and G2' of the tubes rather than control grids G1 and G1'. Modulation does not materially affect the terminating impedance R of the line. The resistance R matches the line and prevents reflection therealong, thus assuring that both tubes are subjected to the same radio frequency voltage but of different phase.

The arrangement of Figure 3 also is in principle the same as the arrangements in Figures 1 and 2, and in Figure 3 reference characters similar to those used in Figures 1 and 2 are made use of in so far as possible. In Figure 3 screen grid modulation is used as in Figure 2.

The transmission line, however, has been replaced by two transmission lines L6 and L8 of different lengths. In this modification the anode A of tube V1 is connected to the tank circuit through the longer line and the anode A' of tube V2 is connected to the tank circuit through the shorter line L8. Consequently, the amplified energy fed from tube V1 will be later in phase, that is, retarded in phase with respect to the energy fed by the tube V2 to the tank circuit. This phase difference is determined by the line length difference $\Delta\tau$. As in Figure 1, any fraction or a multiple of a fraction of difference may be used but a difference of $\tau/4$ or a multiple thereof is preferable.

In Figure 4 I have shown a modification of the arrangement of Figure 1. In this arrangement the phase delay reactance L and phase advancing capacity C are located in the grid excitation circuits of the tubes V1 and V2. The grid direct current circuits include chokes L3, the ends of which remote from the grids G1 and G1' are connected to the cathodes. This bias circuit for the grids includes source 10 and a bias resistance R. The inductances L3 also serve to feed the modulation potential to the grids G1 and G1'.

Here as in the prior figures the grids and anodes of tubes V1 and V2 are connected to points on the tank circuit at opposite sides of the point thereon grounded by condenser C4 so that at these points voltages of opposed or substantially opposed potential appear. In other rsepects this arrangement is similar to the arrangements of the prior figures.

During operation the tank circuit L2—C2 is tuned to the desired carrier; that is, the carrier applicant wishes to send out in the absence of modulation. The control grids G1 and G2 of tubes V1 and V2 receive excitation energy from a point on the tank circuit at one side of the point 0 grounded for radio-frequency. The excitation energy is advanced in phase by the phase shifting circuit including C2, the impedance in tube V2 between the grid and cathode, the impedance L3, R, etc. The excitation energy fed to the grid G1 and tube V1 is retarded in phase by the phase shifting circuit including inductance L, the grid to cathode impedance of V2, L3 and R.

The amplified energy reaching the tank circuit from tube V1 is retarded in phase by the phase retarding circuit including inductance L, while that fed to the tank circuit from V2 is advanced in phase by the phase advancing circuit including condenser C. When no modulation is present, the amplified energies delivered to the tank circuit by tubes V1 and V2 are substantially equal, although they have a fixed phase difference. However, when signal modulation is applied from A through transformer T, the energy delivered by tubes V1 and V2 respectively is alternately increased and decreased in amplitude. Since these energies have a phase difference determined by L and C and since they are differently modulated, the resultant of the energies delivered to the tank circuit will be modulated in phase in accordance with signals, the operation being in general as outlined above.

The modification of Figure 5 is in principle the same as the modification in Figure 4, and in all the figures similar parts have been designated by similar reference characters in so far as possible. The modification in Figure 5 differs from that in Figure 4 in the following main respects:

An artificial line C5—L5 is used to produce the phase displacement between the excitation energies fed to the respective grids G1 and G1' and tubes V1 and V2 to the tank circuit L2—C2. This line is terminated by a matching resistance R to prevent reflection of wave energy along the line. One of the tubes V1 in the modification shown has its grid G1 tapped on the line at a point a fraction of a wave length (or a multiple of a fraction) nearer to the tank circuit L2—C2 than the point to which the grid G1' of tube V2 is tapped. This causes the amplified energy delivered to the tank circuit from tube V1 to lag in phase behind the energy delivered to the tank circuit by the tube V2. The spacing between the points of connection of the anodes A1 and A2 to the inductance of line L can be substantially anything except multiples of $\tau/4$. However, multiples of $\tau/4$ are believed to operate best under most circumstances.

In Figure 5, as in Figure 2, the modulation is applied differentially to the screen grids G2 of the tubes rather than control grids G1.

The arrangement of Figure 6 also is in principle the same as the prior arrangements.

The transmission line of Figure 5, however, has been replaced by two transmission lines L6 and L8 of different lengths. In this modification the grid G1 of tube V1 is connected to the tank circuit through a line L6 longer than the line L8 connecting the grid G1' of tube V2 to the tank circuit. Consequently, the amplified energy fed from tube V1 will be later in phase, that is, retarded in phase with respect to the energy fed by the tube V2 to the tank circuit. This phase difference is determined by the line length difference Δτ. As in Figure 1, any fraction or multiple of a fraction of a wave length difference may be used but a difference of τ/4 of a multiple thereof is preferable.

The surge impedance of lines L6 and L8 of Figure 6 is matched by resistors R1' and R1'' which here also serve to bias the control grids G1 and G1''. Here, as in Figure 5, the grid connection excitation leads should be made equal in length or their difference in length made up in the transmission line lengths and connection.

What is claimed is:

1. In a wave length modulation system, a tank circuit, a pair of electron discharge devices each having input and output electrodes including a cathode, a coupling between a point intermediate the terminals of the tank circuit and the cathodes of said devices, couplings between a point on said tank circuit at one side of said intermediate point and the input electrodes of each of said devices, couplings between a point on said tank circuit at the other side of said intermediate point and the output electrodes of said devices, whereby oscillations are generated in said devices and circuits when operating potentials are applied to the electrodes of the devices and the generated voltages are substantially of opposed phase on said input and output electrodes, phase shifters in at least one of the couplings between the tank circuit and an electrode of one of said devices to alter the said substantially opposed relation between the voltages on the input and output electrodes of said one of said devices and connections for differentially modulating the impedances of said devices in accordance with signals.

2. In a wave length modulation system, a tank circuit, a pair of electron discharge devices each having input and output electrodes including an anode, a control grid and a cathode, a coupling between a point intermediate the terminals of the tank circuit and the cathodes of said devices, couplings between a point on said tank circuit at one side of said intermediate point and the control grids of said devices, phase displacing reactances of different electrical character coupling the anode of each of said devices to a point on said tank circuit on the other side of said intermediate point, connections for applying operating potentials to the electrodes of said devices, a source of modulating potentials and connections for applying said modulating potentials in phase displaced relation to corresponding electrodes of said devices.

3. In a wave length modulation system, a tank circuit, a pair of electron discharge devices each having input and output electrodes including an anode, a control grid and a cathode, a coupling between a point intermediate the terminals of the tank circuit and the cathodes of said devices, couplings between a point on said tank circuit at one side of said intermediate point and the anodes of said devices, phase displacing reactances of different electrical character coupling the grid of each of said devices to a point on said tank circuit on the other side of said intermediate point, connections for applying operating potentials to the electrodes of said devices, a source of modulating potentials and connections for applying said modulating potentials in phase displaced relation to corresponding electrodes of said devices.

4. In a wave length modulation system, a tank circuit, a pair of electron discharge devices each having input and output electrodes including a cathode, a coupling between a point intermediate the terminals of the tank circuit and the cathodes of said devices, couplings between a point on said tank circuit at one side of said intermediate point and the input electrodes of each of said devices, couplings between a point on said tank circuit at the other side of said intermediate point and the output electrodes of said devices, a separate phase shifter in one of the couplings between the tank circuit and an electrode of each device, connections for applying operating potentials to the electrodes of said devices and connections for differentially modulating the impedance of said devices in accordance with signals.

5. In a wave length modulation system, a tank circuit, a pair of electron discharge devices each having input and output electrodes including a cathode, a coupling between a point intermediate the terminals of the tank circuit and the cathodes of said devices, couplings between a point on said tank circuit at one side of said intermediate point and the input electrodes of each of said devices, couplings between a point on said tank circuit and the output electrodes of said devices, an artificial line which provides phase shifting reactance in the couplings between the tank circuit and an electrode of each device, connections for applying operating potentials to the electrodes of said devices and connections for differentially modulating the impedances of said devices in accordance with signals.

6. In a wave length modulation system, a tank circuit, a pair of electron discharge devices each having input and output electrodes including a cathode, a coupling between a point intermediate the terminals of the tank circuit and the cathodes of said devices, couplings between a point on said tank circuit at one side of said intermediate point and the input electrodes of each of said devices, couplings between a point on said tank circuit and the output electrodes of said devices, separate transmission lines of different length in a coupling between the tank circuit and an electrode of each device, connections for applying operating potentials to the electrodes of said devices and connections for differentially modulating the impedances of said devices in accordance with signals.

7. In a wave length modulation system, a tank circuit, a pair of electron discharge devices each having an anode, a control grid and a cathode, a coupling between a point intermediate the terminals of the tank circuit and the cathodes of said devices, couplings between a point on said tank circuit at one side of said intermediate point and the control grids of said devices, a phase displacing reactance coupling the anode of one of said devices to a point on said tank circuit on the other side of said intermediate point, a second phase displacing reactance coupling the anode of the other device to said last point on said tank circuit, connections for applying operating potentials to the electrodes of said devices, a source of modulating potentials and connections for applying said modulating potentials in phase displaced relation and corresponding electrodes of said devices.

8. In a wave length modulation system, a tank circuit, a pair of electron discharge devices each having an anode, a control grid and a cathode, a coupling between a point intermediate the terminals of the tank circuit and the cathodes of said devices, couplings between a point on said tank circuit at one side of said intermediate point and the anodes of said devices, separate phase displacing reactances coupling the grid of each of said devices to the same point on said tank circuit on the other side of said intermediate point, connections for applying operating potentials to the electrodes of said devices, a source of modulating potentials and connections for applying said modulating potentials in phase displaced relation to corresponding electrodes of said devices.

9. In a wave length modulation system, a tank circuit, a pair of electron discharge devices each having an anode, a control grid and a cathode, a coupling between a point intermediate the terminals of the tank circuit and the cathodes of said devices, couplings between a point on said tank circuit at one side of said intermediate point and the control grids of said devices, a phase displacing line coupling the anode of one of said devices to a point on said tank circuit on the other side of said intermediate point, a second phase displacing line of less length coupling the anode of the other device to said last point on said tank circuit, connections for applying operating potentials to the electrodes of said devices, a source of modulating potentials and connections for applying said modulating potentials in phase displaced relation and corresponding electrodes of said devices.

10. In a wave length modulation system, a tank circuit, a pair of electron discharge devices each having an anode, a control grid and a cathode, a coupling between a point intermediate the terminals of the tank circuit and the cathodes of said devices, couplings between a point on said tank circuit at one side of said intermediate point and the control grids of each of said devices, couplings between a point on said tank circuit and the anodes of said devices, an artificial line which provides phase shifting reactance in the couplings between the tank circuit and the anode of each device, connections for applying operating potentials to the electrodes of said devices, and connections for differentially modulating the impedances of said devices in accordance with signals.

11. In a wave length modulation system, a tank circuit, a pair of electron discharge devices each having an anode, a control grid and a cathode, a coupling between a point intermediate the terminals of the tank circuit and the cathodes of said devices, couplings between a point on said tank circuit at one side of said intermediate point and the control grid of each of said devices, couplings between a point on said tank circuit and the anodes of said devices, a phase shifting inductance in the coupling between the tank circuit and the control grid of one device, a phase shifting condenser in the coupling between the tank circuit and the control grid of the other device, connections for applying operating potentials to the electrodes of said devices and connections for differentially modulating the impedances of said devices in accordance with signals.

12. In a wave length modulation system, a tank circuit, a pair of electron discharge devices each having a control grid, an anode and a cathode, a coupling between a point intermediate the terminals of the tank circuit and the cathodes of said devices, couplings between a point on said tank circuit at one side of said intermediate point and the control grid of each of said devices, couplings between a point on said tank circuit and the anodes of each of said devices, said last named coupling comprising an artificial line with spaced points thereon coupled to the anodes of the devices to provide phase shifting reactance of different electrical length in the couplings between the tank circuit and the anode of each device, connections for applying operating potentials to the electrodes of said devices and connections for differentially modulating the impedance of said devices in accordance with signals.

GEORGE L. USSELMAN.